(12) United States Patent
Lee et al.

(10) Patent No.: US 7,185,271 B2
(45) Date of Patent: Feb. 27, 2007

(54) METHODS AND SYSTEMS FOR IMPLEMENTING AUTO-COMPLETE IN A WEB PAGE

(75) Inventors: Kyu-Woong Lee, Milpitas, CA (US); Karen E. Wales, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 10/225,099

(22) Filed: Aug. 20, 2002

(65) Prior Publication Data

US 2004/0039988 A1    Feb. 26, 2004

(51) Int. Cl.
*G06F 17/00* (2006.01)

(52) U.S. Cl. .................. 715/507; 715/534; 715/508

(58) Field of Classification Search ................ 715/507, 715/780, 534, 508, 808, 505, 854; 707/6, 707/5, 3; 365/189.01; 345/173
See application file for complete search history.

(56) References Cited

U.S. PATENT DOCUMENTS

| | | | | |
|---|---|---|---|---|
| 4,969,097 A | * | 11/1990 | Levin | 715/534 |
| 5,680,630 A | * | 10/1997 | Saint-Laurent | 715/534 |
| 5,704,029 A | * | 12/1997 | Wright, Jr. | 715/505 |
| 5,742,836 A | * | 4/1998 | Turpin et al. | 715/507 |
| 5,805,911 A | * | 9/1998 | Miller | 715/534 |
| 5,845,300 A | * | 12/1998 | Comer et al. | 715/508 |
| 5,848,386 A | * | 12/1998 | Motoyama | 704/5 |
| 5,864,340 A | * | 1/1999 | Bertram et al. | 715/780 |
| 5,875,443 A | * | 2/1999 | Nielsen | 707/2 |
| 5,896,321 A | * | 4/1999 | Miller et al. | 365/189.01 |
| 5,959,629 A | * | 9/1999 | Masui | 715/808 |
| 6,008,799 A | * | 12/1999 | Van Kleeck | 345/173 |
| 6,061,646 A | * | 5/2000 | Martino et al. | 704/3 |
| 6,182,027 B1 | * | 1/2001 | Nasukawa et al. | 704/2 |
| 6,208,339 B1 | * | 3/2001 | Atlas et al. | 715/780 |
| 6,305,008 B1 | * | 10/2001 | Vaidyanathan et al. | 717/111 |
| 6,310,634 B1 | * | 10/2001 | Bodnar et al. | 715/854 |
| 6,367,068 B1 | * | 4/2002 | Vaidyanathan et al. | 717/143 |
| 6,377,965 B1 | * | 4/2002 | Hachamovitch et al. | 715/534 |
| 6,490,548 B1 | * | 12/2002 | Engel | 704/10 |

(Continued)

OTHER PUBLICATIONS

Frank et al, "Adaptive Forms: An Interaction Paradigm for Entering Structured Data", 1998, ACM.*

(Continued)

*Primary Examiner*—William Bashore
*Assistant Examiner*—James H. Blackwell

(57) ABSTRACT

A computer-implemented method for facilitating auto-completion of user data input in a web page. The method includes receiving, during execution time of the web page, first user data input in a first data input field of the web page. The method also includes analyzing, during the execution time, the first user data input to ascertain among plurality of dictionary objects a first dictionary object. The first dictionary object represents a dictionary object from which candidate matches against the first user data input would be presented to a user of the web page. The plurality of dictionary objects are associated with the first data input field during build time of the web page. The method additionally includes matching at least a portion of the first user data input against members of the first dictionary object to obtain a first list of candidate matches. The method further includes presenting the first list of candidate matches to the user of the web page.

44 Claims, 4 Drawing Sheets

U.S. PATENT DOCUMENTS

| | | | |
|---|---|---|---|
| 6,564,213 B1* | 5/2003 | Ortega et al. | 707/5 |
| 6,732,090 B2* | 5/2004 | Shanahan et al. | 707/3 |
| 6,778,979 B2* | 8/2004 | Grefenstette et al. | 707/3 |
| 6,782,510 B1* | 8/2004 | Gross et al. | 715/533 |
| 6,820,075 B2* | 11/2004 | Shanahan et al. | 707/3 |
| 6,829,607 B1* | 12/2004 | Tafoya et al. | 707/6 |
| 6,922,809 B2* | 7/2005 | Coden et al. | 715/531 |
| 6,922,810 B1* | 7/2005 | Trower et al. | 715/534 |
| 6,928,425 B2* | 8/2005 | Grefenstette et al. | 707/2 |
| 6,952,805 B1* | 10/2005 | Tafoya et al. | 715/739 |
| 2002/0078070 A1* | 6/2002 | Eshelman et al. | 707/200 |
| 2002/0175940 A1* | 11/2002 | Lection et al. | 345/764 |
| 2003/0033288 A1* | 2/2003 | Shanahan et al. | 707/3 |
| 2003/0104839 A1* | 6/2003 | Kraft et al. | 455/566 |
| 2004/0205448 A1* | 10/2004 | Grefenstette et al. | 715/500 |
| 2004/0205671 A1* | 10/2004 | Sukehiro et al. | 715/532 |
| 2005/0080613 A1* | 4/2005 | Colledge et al. | 704/9 |
| 2005/0114771 A1* | 5/2005 | Piehler et al. | 715/536 |

OTHER PUBLICATIONS

Unknown, "TextPlus for the Palm OS, Ver. 5.7 User's Guide", SmartCell Technology, 1999-2003.*

Das et al,"Experiments in Using Agent-Based Retrieval from Distributed and Heterogeneous Databases", 1997 IEEE pp. 27-35.*

Hyvonen et al,"Semantic Autocompletion", 2005, Helsinki Univ of Tech., Media Tech.*

* cited by examiner

METHODS AND SYSTEMS FOR IMPLEMENTING AUTO-COMPLETE IN A WEB PAGE

BACKGROUND OF THE INVENTION

Web pages, such as those implemented by the Hypertext Markup Language (HTML) or Extensible Markup Language (XML), are common nowadays. Such web pages may be employed to provide information to the computer user as well as to receive user input. To receive user input, the web page may have one or more data input fields. The user may enter data of various formats and types into the different data input fields, as is well known.

To improve user-friendliness, some data input fields in a web page may employ an auto-complete feature to assist the user in the data entry task. In a typical prior art web page, such as one implementing the well-known Yahoo™ main search page (www.yahoo.com), the user may enter a search term, which may be a word or a phrase, into an appropriate field on the page in order to instruct the Yahoo search engine to search the web for the relevant web pages. By way of example, the user may enter the term "garden," "gardening," or "gardener" to pull up web pages related to various aspects of maintaining a garden.

To implement the auto-complete feature, the user-entered search terms are stored by the browser and subsequently presented to the user as selectable choices during the subsequent data entry. For example, if the user wishes to perform another search at a later time using the search term "gardening" again, the user may, upon typing the character "g," be furnished with a dropdown list containing all the previously entered search terms that start with the character "g." The user may then pick among the choices offered or may wish to continue typing to narrow down the list of choices in the drop-down list further.

Suppose the user continues typing and enters two more characters so that the characters "gar" are entered, and the only three previously entered terms that start with "gar" are the aforementioned terms "garden," "gardening," and "gardener." In this case, the auto-complete feature would present the user with a shortened list containing only these three previously entered terms. At this point, the user may pick the presented choice "gardening" in the dropdown list (e.g., by using the mouse), thereby completing the desired data entry instead of having to type in the remaining six characters.

Of course if the user wishes to enter an entirely new search term such as "gardenia" to look up web pages containing relevant information about the cape jasmine shrub, the user may continue typing in order to manually input the entire search term. Since this new entry does not match any of the stored entries, the new entry is added to the historical data so that the next time the user performs a search, all four terms "garden," "gardening," "gardener," and "gardenia" will be presented to the user after the user enters the characters "gar."

Although the use of historical data (e.g., the previously entered terms) to implement the auto-complete feature is helpful in many cases, further refinements and/or alternate arrangements are possible. These further refinements and/or alternate arrangements are addressed herein.

SUMMARY OF THE INVENTION

The invention relates, in one embodiment, to a computer-implemented method for facilitating auto-completion of user data input in a web page. The method includes receiving, during execution time of the web page, first user data input in a first data input field of the web page. The method also includes analyzing, during the execution time, the first user data input to ascertain among plurality of dictionary objects a first dictionary object. The first dictionary object represents a dictionary object from which candidate matches against the first user data input would be presented to a user of the web page. The plurality of dictionary objects are associated with the first data input field during build time of the web page. The method additionally includes matching at least a portion of the first user data input against members of the first dictionary object to obtain a first list of candidate matches. The method further includes presenting the first list of candidate matches to the user of the web page.

In another embodiment, the invention relates to a method for implementing auto-completion of user data input in a web page. The method includes associating, during build time, a first data input field in the web page with a plurality of dictionary objects. The method further includes providing the web page for use during execution time, wherein the web page is configured to facilitate matching, during the execution time, at least a portion of first user data input into the first data input field against members of a first one of the plurality of dictionary objects to obtain a first list of user-selectable candidate choices, wherein one of the user-selectable candidate choices in the first list, when selected by a user of the web page, is assigned to a variable associated with the first data input field.

In yet another embodiment, the invention relates to a computer-implemented method for facilitating auto-completion of user data input in a web page. The method includes receiving, during execution time of the web page, a first set of user-input characters in a first data input field of the web page. The method also includes analyzing, during the execution time, the first set of user-input characters to ascertain among plurality of dictionary objects a first dictionary object. The first dictionary object represents a dictionary object from which candidate matches against the first user data input would be presented to a user of the web page. The plurality of dictionary objects are associated with the first data input field during build time of the web page. The method further includes matching the first set of user-input characters against members of the first dictionary object to obtain a first list of candidate matches. The method additionally includes presenting the first list of candidate matches to a user of the web page.

In yet another embodiment, the invention relates to an article of manufacture comprising a program storage medium having computer readable code embodied therein, the computer readable code being configured to facilitate auto-completion of user data input in a computer display screen. There is included computer readable code for receiving, during execution time for rendering the computer display screen, first user data input in a first data input field of the computer display screen. There is further included computer readable code for analyzing, during the execution time, the first user data input to ascertain among plurality of dictionary objects a first dictionary object. The first dictionary object represents a dictionary object from which candidate matches against the first user data input would be presented to a user of the computer display screen, the plurality of dictionary objects being associated with the first data input field during build time of the computer display screen. There is additionally included computer readable code for matching at least a portion of the first user data input against members of the first dictionary object to obtain a first list of candidate matches. Furthermore, there is included computer readable code for presenting the first list of candidate matches to the user of the computer display screen.

In a further embodiment, the invention relates to an arrangement for facilitating auto-completion of user data input in a web page. The arrangement includes means for receiving, during execution time of the web page, a first set of user-input characters in a first data input field of the web page. The arrangement further includes means for analyzing, during the execution time, the first set of user-input characters to ascertain among plurality of dictionary objects a first dictionary object. The first dictionary object represents a dictionary object from which candidate matches against the first user data input would be presented to a user of the web page, the plurality of dictionary objects being associated with the first data input field during build time of the web page. The arrangement further includes means for matching the first set of user-input characters against members of the first dictionary object to obtain a first list of candidate matches. The arrangement additionally includes means for presenting the first list of candidate matches to a user of the web page.

In still another embodiment, the invention relates to a computer software product having an auto-completion capability for user data input. The computer software product includes a data input arrangement for receiving, during execution time of the computer software product, a first user data input. The computer software product further includes logic for comparing, during the execution time, the first user data input with members of a first dictionary to obtain a set of candidate choices. The first dictionary being selected, during the execution time responsive to the first user data input, from a plurality of dictionaries associated with the data input arrangement during build time of the computer software product. The computer software product additionally includes a data output arrangement for presenting in a computer display screen the set of candidate choices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
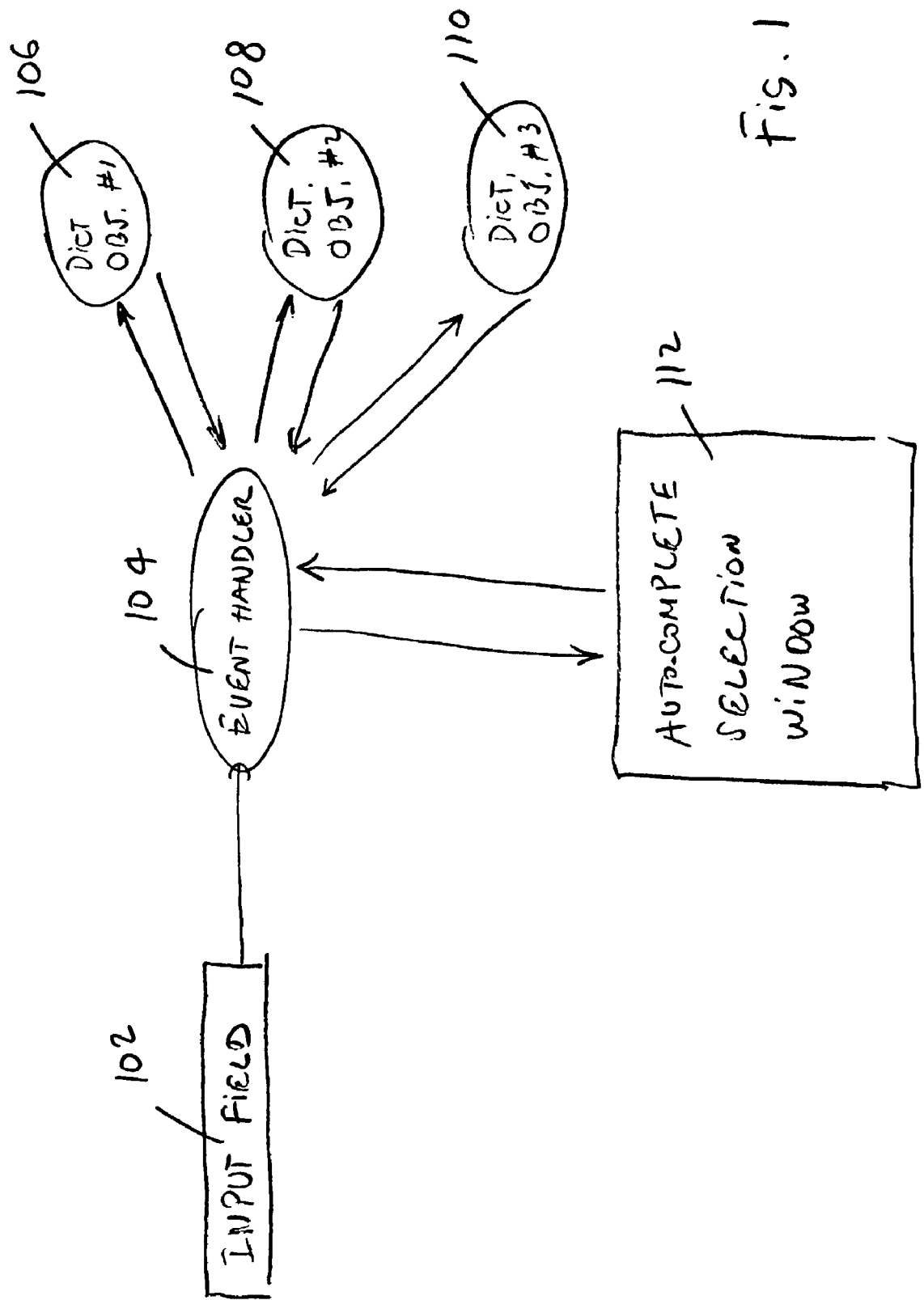
FIG. 1 is a logic diagram illustrating, in accordance with one embodiment of the present invention, the more relevant logic blocks for implementing the auto-complete feature in a web page.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided methods and apparatus for implementing the auto-complete feature in a website such that any arbitrary data input field can be associated during build time (i.e., at the time the web page is created) with any dictionary object. As the term is employed herein, a dictionary object may be any data source containing a collection of members, with individual members being potential candidates for an auto-complete match. Unlike the prior art approach, the data source does not have to be historical data and, in some cases, may not even contain entries previously made by the user. As the user enters one or more characters into the data input field, a list of user-selectable candidate matches is created. The list of user-selectable candidate matches is refreshed either continually or from time-to-time to take into account any newly entered data. At some point, the user may pick from one of the user-selectable candidate matches presented instead of continuing to enter data. Once one of the user-selectable candidate matches is chosen, the user's entry assumes the value of the chosen match. That is, the selected candidate match is assigned to the variable associated with the data input field, thereby achieving auto-completion of the user data input.

In one embodiment, multiple dictionary objects may be provided. A data input field may be provisionally associated with multiple dictionary objects during build time. At execution time (i.e., when the web page is presented to the user for the purpose of obtaining user input), the user data input or a portion thereof will be analyzed in order to ascertain among the provisionally associated dictionary objects the one dictionary object to be used in selecting candidate matches. By way of example, a web page implementing a payroll application may have a certain data input field provisionally associated with two dictionary objects during build time: a dictionary object for names and a dictionary object for employee number. If the user enters numbers in the format representative of an employee numbers, it may be ascertained by the auto-complete engine that the user intends to enter the employee number and not the employee name. Accordingly, the employee number dictionary object will be employed for auto-complete matching purposes.

In one embodiment, the association between a data input field and a dictionary object may be made programmatically during execution time. The association may be based on the analysis of the data inputted by the user into the data input field. Such analysis may include, for example, parsing, pattern analysis, data type analysis, string matching, and/or any other suitable data analysis technique. Furthermore, the association for one or more data input fields on a web page may be made during execution time responsive to the association made earlier with respect to another data input field. Suppose in the earlier example that the user begins typing numbers into the data input field. In this case, the entry of a few numbers into the data input field causes the auto-complete engine to ascertain that the user is entering an employee number and that the employee number dictionary object is to be used. Furthermore, this association may cause the subsequent data input fields to be programmatically associated with a specific group of dictionary objects. If the user had instead entered letters indicative of a part of name, the name dictionary object would have been chosen and the subsequent data input fields may be programmatically associated with another specific group of dictionary objects, for example.

In one embodiment, even the content of the user's data entry may be analyzed to programmatically associate subsequent data input fields with specific dictionary objects. In the above example, suppose the user enters an employee number associated with a low-level position that is not qualified for participation the company's stock option plan. In this case, the value of the entered data may be employed to modify the data content of the web page, e.g., to remove any discussion and/or data input field that pertains to the company's stock option program. In one embodiment, a portion of the content of a web page may be delayed from being displayed to the user until it is ascertained from the user's input which dictionary object would be employed for matching purposes (and concomitantly what the remaining content should be). Alternatively or additionally, the value of the entered data may be employed to modify the data content of one or more subsequent web pages, e.g., to remove any discussion and/or data input field that pertains to the company's stock option program in the subsequent web page(s).

Further, the value of the entered data may determine the associations between the other data input fields in the web page and specific dictionary objects. In the previous example, once it is ascertained that the user's entry relates to an employee in a low level position in the company, the "salary" data input field would be programmatically associated with the hourly rate dictionary object. In another example, if the user enters an employee number for a high level employee, the "salary" data input field may be programmatically associated with an incentive compensation dictionary object instead of the aforementioned hourly rate dictionary object.

Generally speaking, embodiments of the invention may be implemented in one or more computers, which may be stand-alone or networked together. As employed herein, the term computer includes any electronic device that includes or is controlled by a processor and/or logic circuitry. Those electronic devices may include, for example, servers, desktop computers, laptop computers, palm-top computers, personal digital assistants (PDAs), handheld or cellular phones, networked terminals or Internet terminals, and the like. The various embodiments of the invention may be implemented as computer-readable code on a computer readable medium, and may be distributed and employed as a single stand-alone product or system or may be distributed and employed as a part of a more complex product or system.

These and other features and advantages of the present invention may be better understood with reference to the discussions and figures below. FIG. 1 is a logic diagram illustrating, in accordance with one embodiment of the present invention, the more relevant logic blocks for implementing the auto-complete feature in a web page. In FIG. 1, there is shown a data input field 102, representing the field in the web page where data may be inputted by the user. There may be multiple data input fields in a web page, of which only one is shown. A user's entry of any character into data input field 102 triggers an event handler 104 to implement the auto-complete feature. If data input field 102 was provisionally associated with all three dictionary objects 106, 108, and 110, event handler 104 first determines, based on the characters entered, which of the provisionally associated dictionary objects (e.g., 106, 108, or 110) should be employed for auto-complete matching purposes.

In one embodiment, the user may be asked to clarify what type of data the user is currently entering (e.g., name or employee number) in order for the auto-complete engine to create the correct association between data input field 102 and one of dictionary objects 106, 108, and 110. In a preferred embodiment, the entered data is automatically analyzed for type, format, and/or content in order to ascertain what type of data the user is trying to enter and to obtain the correct dictionary object for the auto-complete matching task. Of course, input field 102 may be associated beforehand with only one of dictionary objects 106, 108, and 110 if such is desired.

Once the dictionary object is ascertained, the user's entry or a portion thereof is matched against members of the selected dictionary object in order to present a list of user-selectable candidate matches for the user to choose from. In general, any data matching algorithm or technique may be employed between a user entry and members of the associated dictionary object. The candidate matches are sent back to event handler 104 for presentation in window 112. Event handler 104 also controls other display-related aspects in window 112, and other data input fields of the web page may be handled by event handler 104 in an analogous fashion.

Figure 2:
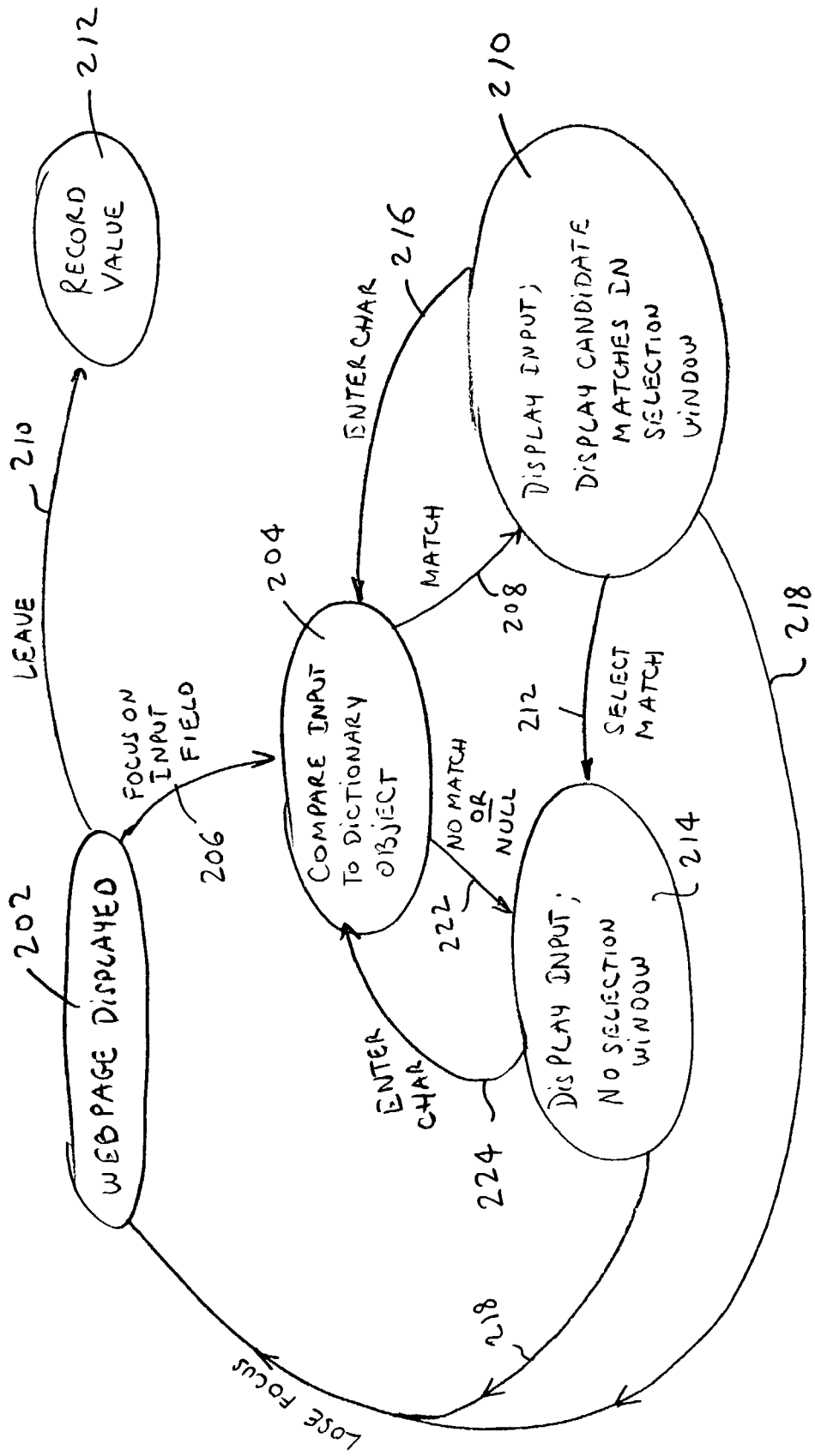
FIG. 2 shows, in accordance with one embodiment of the present invention, a state diagram illustrating the steps involved in auto-completion of an input entry.

FIG. 2 shows, in accordance with one embodiment of the present invention, a state diagram illustrating the steps involved in auto-completion of an input entry. In state 202, the web page containing the data input field is displayed. Preferably, the default auto-complete feature (e.g., one based on historical data entries) is disabled.

By way of example, HTML furnishes the following syntax <input type=*autocomplete="off"> and/or <form autocomplete="off"> to turn off the default auto-complete so that the inventive auto-complete technique may be implanted instead.

From state 202, the user can choose to leave the page (arrow 210), in which case the value in the data input field is recorded. Often times, there may be a default data input value or empty initially, and these values may be recorded in state 212.

State 202 becomes state 204 via arrow 206 when the data input field is the focus. This may happen after, for example, the user clicks on the data input field to indicate a desire to begin entering data.

In state 204, the user input is received. As the user enters each character, preferably the entire input string (including the previously entered character(s), if any, and the newly entered character) is tested against the dictionary entries. If the evaluation in state 204 reveals one or more matches with the dictionary entries (arrow 208), state 210 is entered to enable the display of the characters entered thus far into the input field, along with the possible matches in a selection window for user selection. From state 220, the user can select one of the matches (arrow 212) to enable the display of the selected match in the input field (state 214). Since the user already selected one of the matches, no selection window is displayed in state 214.

Alternatively, from state 220, the user can enter additional characters into the data input field (arrow 216), causing state 204 to be re-entered and enabling the evaluation process to occur again against the dictionary entries. As another alternative, also from state 210, the user may lose focus of the data entry process (e.g., by clicking elsewhere on the web page, hitting the <enter> key to indicate that the user input is finished, and the like). In this case, arrow 218 is followed to return to state 202 to wait for the next user action that involves auto-completion, such as focus on the data entry field (arrow 206) or leave the page altogether (arrow 210 to state 212). Of course while in state 202, the user can stay in state 202 to perform other tasks that are not related to auto-completion. If the user chooses the leave the page, the value displayed in the input field is recorded in state 212.

In state 204, if the input is evaluated to be empty or there are no matches (arrow 222), state 214 is entered to enable the display of what has been entered into the data input field thus far (which is either empty or simply what the user has entered). Since there are no matches, no selection window is displayed in state 214.

From state 214, the user can enter additional characters into the data input field (arrow 224), causing state 204 to be re-entered and enabling the evaluation process to occur again against the dictionary entries. As another alternative, also from state 214, the user may lose focus of the data entry process (e.g., by clicking elsewhere on the web page, hitting the <enter> key to indicate that the user input is finished, and the like). In this case, arrow 218 is followed to return to state 202 to wait for the next user action that involves auto-completion, such as focus on the data entry field (arrow 206) or leave the page altogether (arrow 210 to state 212). As mentioned, while in state 202, the user can stay in state 202 to perform other tasks that are not related to auto-completion. If the user chooses the leave the page, the value displayed in the input field is recorded in state 212.

Figure 3:
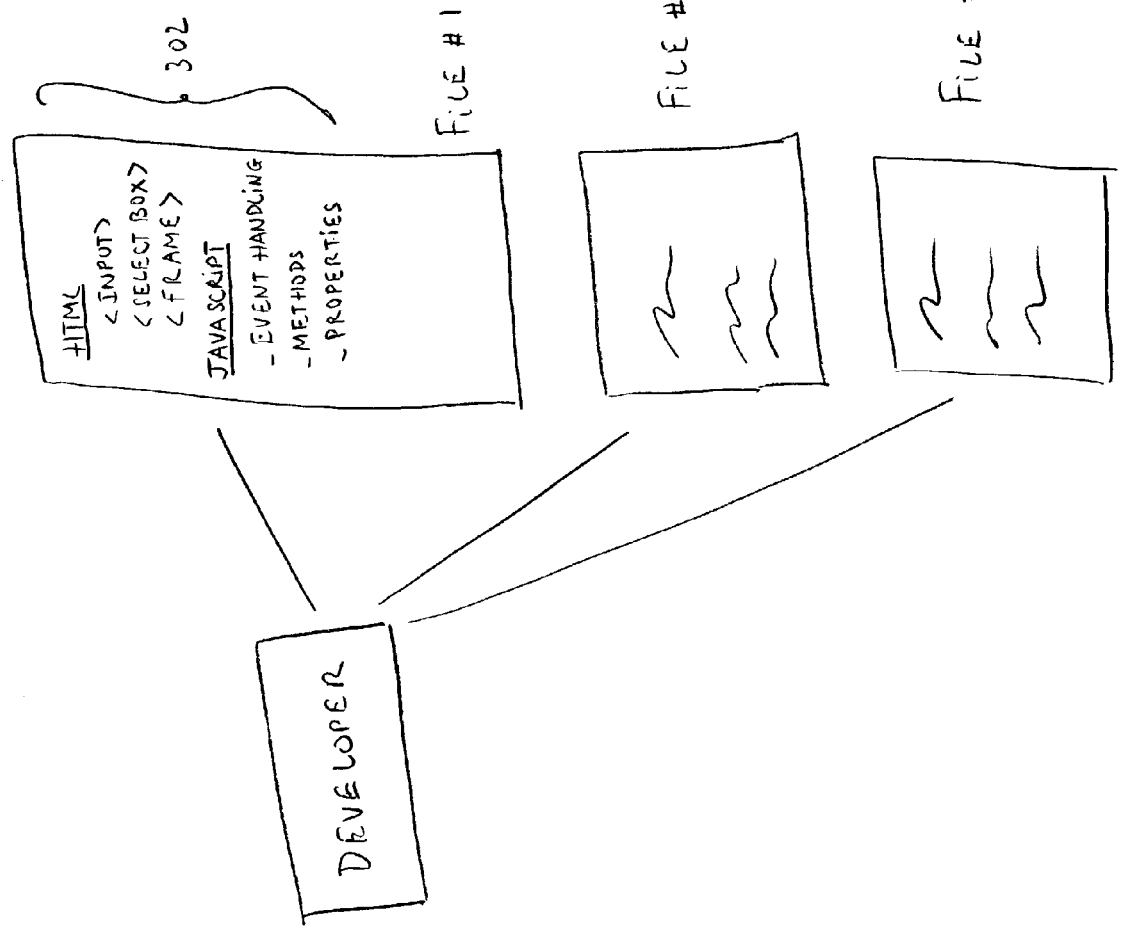
FIG. 3 diagrammatically illustrates, in accordance with this embodiment, a developer's view of the development environment for implementing the auto-complete feature through existing HTML tags.

In one embodiment, the auto-complete feature may be implemented using existing objects and tags in an existing markup language, such as HTML or XML. FIG. 3 diagrammatically illustrates, in accordance with this embodiment, a developer's view of the development environment for implementing the auto-complete feature through existing HTML tags. In FIG. 3, the existing HTML tags are employed to handle inputting of the user's entry and the presentation of the auto-complete match candidates. Thus, there is shown an <INPUT> tag, a <SELECT BOX> tag, and a <FRAME> tag, representing existing HTML tags and objects employed for the data inputting and presentation tasks.

A scripting language, such as JavaScript by Sun Microsystems, Inc. of Palo Alto, Calif. is then employed to perform event handling, to handle the logic, to apply methods and properties on the HTML objects, and the like. To clarify, methods generally refer to actions taken with respect to an object. For example, if the object being referred to is a box, methods may refer to actions such as emptying the box, moving the box, and the like, while properties generally refer to attributes of the object, such as whether that box is scrollable or sizable.

The code section 302, comprising both the existing tags/objects and the script code, is then called upon each time an auto-complete function utilizing the same dictionary and/or data type is required. Files #2 and #3 in FIG. 3 illustrate other files that may require the use of the same auto-complete function. In the implementation of FIG. 3, the code section 302 needs to be reproduced in each of files #2 and #3 to implement an auto-complete function utilizing the same dictionary and/or data type.

Figure 4:
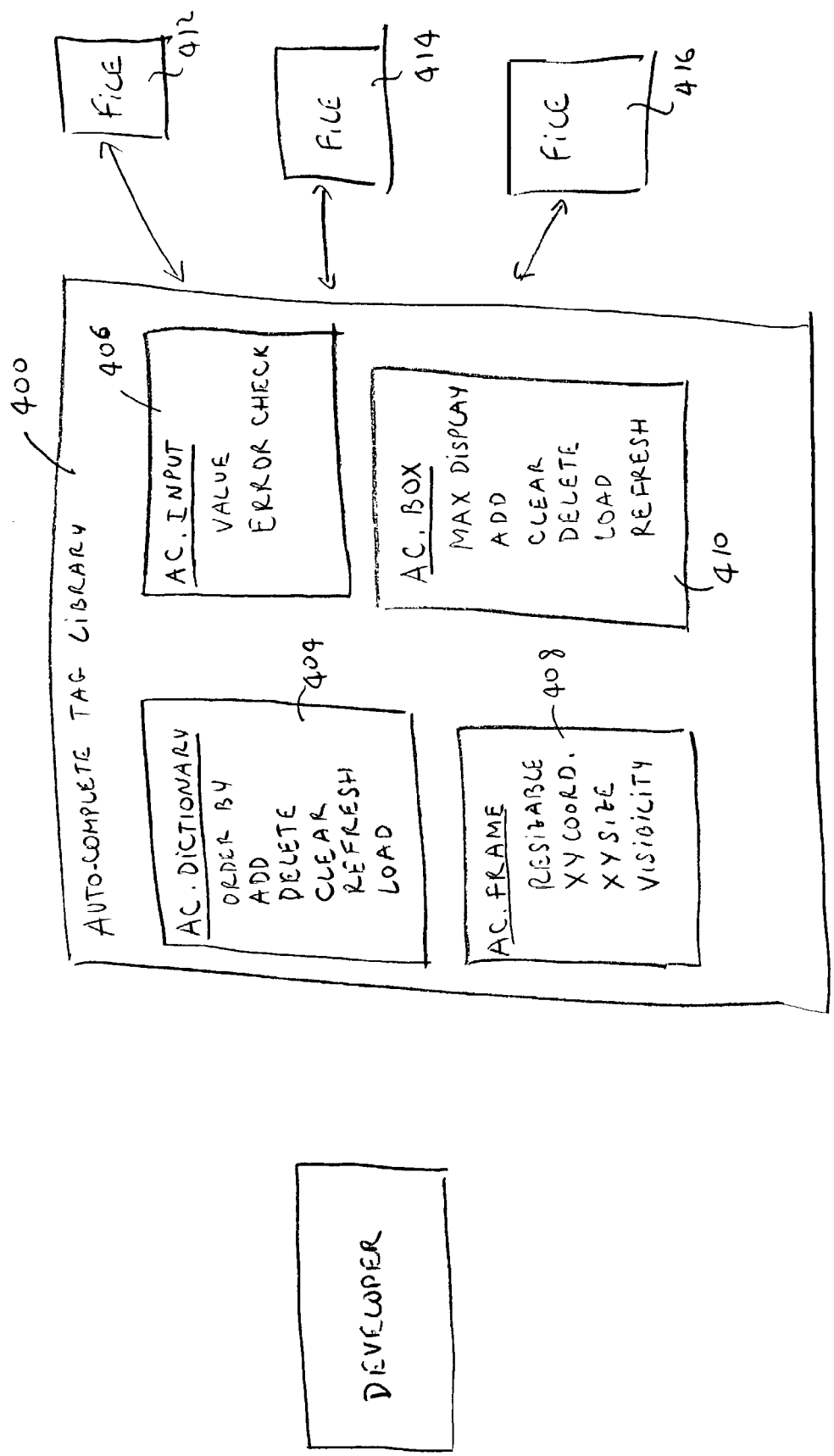
FIG. 4 illustrates, in accordance with another embodiment of the present invention, a developer's view of the development environment for implementing the auto-complete feature through tag libraries.

To further enhance modularity, tag libraries may be employed. FIG. 4 illustrates, in accordance with another embodiment of the present invention, a developer's view of the development environment for implementing the auto-complete feature through tag libraries. One should keep in mind, however, that the properties and methods applicable to the present auto-complete invention is not limited to the specific properties and methods discussed in the specific example of FIG. 4. Indeed, the properties and methods, as well as the type of dictionary involved, may vary widely according to needs.

In FIG. 4, there is shown an auto-complete tag library 400. In contrast to the implementation of FIG. 3, the functionalities provided by the existing tags and objects, as well as by the script codes, are implemented in various objects 404, 406, 408, and 410 of the tag library. When the tags are imported and executed, an auto-complete object is instantiated, and there is no need to duplicate the codes in various files or various sections of a file.

In the example of FIG. 4, object 404 (AC.DICTIONARY) implements the dictionary as an object. Thus, there may be methods such as ORDER BY, ADD, DELETE, CLEAR, REFRESH, AND LOAD associated with AC.DICTIONARY object 404. ORDER BY dictates the sort order of the dictionary entries. ADD and DELETE adds and removes entries respectively from the dictionary and may take either the number of entries as an argument or a specified string as an argument. CLEAR essentially clears out the dictionary while LOAD allows a data object (such as a data file) to be loaded into the dictionary. REFRESH updates the dictionary. REFRESH may be useful in case of, for example, one of the entries in the dictionary is added, modified, or deleted while on the same web page.

Object 406 (AC.INPUT) implements the input object in the example of FIG. 4. Thus, object 406 may include the ERROR CHECK method to perform error checking on the user input as well as the variable VALUE to hold the user input.

Object 408 (AC.FRAME) implements the frame in the example of FIG. 4. Thus, object 408 may include properties such as the XY coordinates of the frame corners and the XY size, the visibility of the frame itself during various states, whether the frame is resizable (RESIZABLE), and the like.

Object 410 (AC.BOX) implements the box within the frame that actually displays the auto-complete match candidates. Thus, object 410 may include properties such as the maximum number of displayed candidates, the XY size, the visibility of the box itself during various states, whether the box is scrollable (SCROLLABLE), and the like.

Since the auto-complete functionality, including the dictionary and the associated methods and properties are implemented as a tag library, modularity is greatly enhanced. If the same auto-complete function is required in another file (such as file 412, file 414, and/or file 416), these files only have to import the tags without having to duplicate the codes that create the objects within auto-complete tag library 400. If there is a change in the dictionary or any of the methods or properties implemented by the objects in the tag library 400, changes have to be made only once at this centralized location, obviating the need to update the codes in multiple duplicate locations.

Alternatively, the auto-complete feature may be implemented by built-in elements of a mark-up language, such as a future version of HTML or XML. As such, the aforementioned discussed properties and methods may be made part of the document object model (DOM), and be available for use like any built-in tag or object of the mark-up language.

The ability to load a data source into a library for auto-complete purposes offer many advantages. For precise, highly complex data entry tasks, the ability to auto-complete from a predefined list of potential match candidates may be quite useful. Consider the example of a web page form having an input field that requires the network administrator/user to fill out the node name of a given node in a 10,000-node network. Implementing such an input field as a drop-down list would have been awkward, potentially requiring the user to scroll through a large number of entries before a selection can be made. Since the node name that need to be entered may have never been entered before, an auto-complete implementation based on previous entry (such as that implemented by the Yahoo example discussed earlier) would not have sufficed. The invention allows the list of these network nodes to be loaded into the dictionary. When the network administrator/user types in the few characters related to that node name, the list of potential candidates (each of which a valid node name) would be narrowed down quickly to the point where a reasonable list of potential auto-complete matches could be presented to the network administrator/user for selection.

While this invention has been described in terms of several preferred embodiments, there are alterations, permutations, and equivalents which fall within the scope of this invention. For example, it is possible to compare the user input against entries multiple dictionaries simultaneously, if such is desired. Furthermore, entries in the historical data list may be used in combination with entries one or more of the pre-defined dictionaries simultaneously for the purpose of auto-matching if such is desired. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for facilitating auto-completion of user data input in a web page, comprising:
    receiving, during execution time of said web page, first user data input in a first data input field of said web page;
    automatically analyzing, during said execution time, said first user data input to select among a plurality of dictionary objects a first dictionary object, said first dictionary object being selected based on at least one of type, format, and content of said first user data input and representing a dictionary object from which candidate matches against said first user data input would be presented to a user of said web page, said plurality of dictionary objects representing a subset of available dictionary objects and being associated with said first data input field during build time of said web page;
    matching at least a portion of said first user data input against members of said first dictionary object to obtain a first list of candidate matches; and
    presenting said first list of candidate matches to said user of said web page.

2. The computer-implemented method of claim 1 further comprising:
    receiving second user data input in said first data input field;
    revising said first list of candidate matches based on additional information in said second user data input to obtain a second list of candidate matches, members of said second list of candidate matches being also members of said first dictionary object; and
    presenting said second list of candidate matches to said user in lieu of said first list of candidate matches.

3. The computer-implemented method of claim 1 wherein at least a portion of said web page is implemented using at least one of the Hypertext Markup Language (HTML) and the Extensible Markup Language (XML).

4. The computer-implemented method of claim 3 wherein said first user data input is analyzed using a data analyzing technique that includes parsing said first user data input.

5. The computer-implemented method of claim 1 wherein an association between a second data input field in said web page and one of said plurality of dictionary objects varies responsive to which dictionary object in said plurality of dictionary objects is employed as said first dictionary object.

6. The computer-implemented method of claim 1 wherein a number of data input fields in said web page changes depending on which dictionary object in said plurality of dictionary objects is employed as said first dictionary object.

7. The computer-implemented method of claim 1 wherein information presented in said web page changes depending on which dictionary object in said plurality of dictionary objects is employed as said first dictionary object.

8. The computer-implemented method of claim 1 wherein information presented in a subsequent web page that is presented later in time relative to said web page changes depending on which dictionary object in said plurality of dictionary objects is employed as said first dictionary object.

9. The computer-implemented method of claim 1 wherein at least one of said plurality of dictionary objects is a file containing historical data entries by said user of said web page.

10. A method for implementing auto-completion of user data input in a web page, comprising:
    associating, during build time, a first data input field in said web page with a plurality of dictionary objects, said plurality of dictionary objects representing a subset of available dictionary objects; and
    thereafter, providing said web page for use during execution time, wherein said web page is configured to facilitate matching, during said execution time, at least a portion of first user data input into said first data input field against members of a first one of said plurality of dictionary objects to obtain a first list of user-selectable candidate choices, wherein one of said user-selectable candidate choices in said first list, when selected by a user of said web page, is assigned to a variable associated with said first data input field, wherein said first user data input is automatically analyzed to select, based on at least one of type, format, and content of said first user data input, which dictionary object in said plurality of dictionary objects would be employed as said first one of said plurality of dictionary objects prior to said matching.

11. The method of claim 10 wherein at least a portion of said web page is implemented using at least one of the Hypertext Markup Language (HTML) and the Extensible Markup Language (XML).

12. The method of claim 10 wherein at least a portion of said web page is implemented using the Hypertext Markup Language (HTML).

13. The method of claim 10 wherein said first user data input is analyzed using a data analyzing technique that includes parsing said portion of said first user data input.

14. The method of claim 10 wherein an association between a second data input field in said web page and one of said plurality of dictionary objects varies responsive to which dictionary object in said plurality of dictionary objects is employed as said first one of said plurality of dictionary objects.

15. The method of claim 10 wherein a number of data input fields in said web page changes depending on which dictionary object in said plurality of dictionary objects is employed as said first one of said plurality of dictionary objects.

16. The method of claim 10 wherein information presented in said web page changes depending on which dictionary object in said plurality of dictionary objects is employed as said first one of said plurality of dictionary objects.

17. A computer-implemented arrangement for facilitating auto-completion of user data input in a web page, comprising:
   a data input arrangement configured to receive, during execution time of said web page, a first set of user-input characters in a first data input field of said web page;
   logic configured to automatically analyze, during said execution time, said first set of user-input characters to ascertain among plurality of dictionary objects a first dictionary object, said first dictionary object being selected based on at least one of type, format, and content of said first user data input and representing a dictionary object from which candidate matches against said first user data input would be presented to a user of said web page, said plurality of dictionary objects representing a subset of available dictionary objects and being associated with said first data input field during build time of said web page;
   logic configured to match said first set of user-input characters against members of said first dictionary object to obtain a first list of candidate matches; and
   a data presentation arrangement for presenting said first list of candidate matches to a user of said web page.

18. The computer-implemented arrangement of claim 17 wherein an association between a second data input field in said web page and one of said plurality of dictionary objects varies responsive to which dictionary object in said plurality of dictionary objects is employed as said first dictionary object.

19. The computer-implemented arrangement of claim 17 wherein at least a portion of said web page is implemented using a mark-up language.

20. An arrangement for facilitating auto-completion of user data input in a web page, comprising:
   means for receiving, during execution time of said web page, a first set of user-input characters in a first data input field of said web page;
   means for automatically analyzing, during said execution time, said first set of user-input characters to ascertain among plurality of dictionary objects a first dictionary object, said first dictionary object being selected based on at least one of type, format, and content of said first user data input and representing a dictionary object from which candidate matches against said first user data input would be presented to a user of said web page, said plurality of dictionary objects representing a subset of available dictionary objects and being associated with said first data input field during build time of said web page;
   means for matching said first set of user-input characters against members of said first dictionary object to obtain a first list of candidate matches; and
   means for presenting said first list of candidate matches to a user of said web page.

21. The arrangement of claim 20 wherein at least a portion of said web page is implemented using at least one of the Hypertext Markup Language (HTML) and the Extensible Markup Language (XML).

22. The arrangement of claim 20 wherein an association between a second data input field in said web page and one of said plurality of dictionary objects varies responsive to which dictionary object in said plurality of dictionary objects is employed as said first dictionary object.

23. The arrangement of claim 20 wherein a number of data input fields in said web page changes depending on which dictionary object in said plurality of dictionary objects is employed as said first dictionary object.

24. The arrangement of claim 20 wherein information presented in said web page changes depending on which dictionary object in said plurality of dictionary objects is employed as said first dictionary object.

25. The arrangement of claim 20 wherein information presented in a subsequent web page that is presented later in time relative to said web page changes depending on which dictionary object in said plurality of dictionary objects is employed as said first dictionary object.

26. A computer software product having an auto-completion capability for user data input, said computer software product comprising:
   a data input arrangement for receiving, during execution time of said computer software product, a first user data input;
   logic for comparing, during said execution time, said first user data input with members of a first dictionary to obtain a set of candidate choices, said first dictionary being automatically selected, during said execution time responsive to an analysis of at least one of type, format, and content of said first user data input, from a plurality of dictionaries associated with said data input arrangement during build time of said computer software product, said plurality of dictionaries represent a subset of available dictionaries; and
   a data output arrangement for presenting in a computer display screen said set of candidate choices.

27. The computer software product of claim 26 wherein at least a portion of said computer display screen is implemented using at least one of the Hypertext Markup Language (HTML) and the Extensible Markup Language (XML).

28. The computer software product of claim 26 wherein at least a portion of said computer display screen is implemented using a mark-up language.

29. The computer software product of claim 28 wherein a number of data input fields in said computer display screen changes depending on which dictionary in said plurality of dictionaries is employed as said first dictionary.

30. The computer software product of claim 28 wherein information presented in said computer display screen changes depending on which dictionary in said plurality of dictionaries is employed as said first dictionary.

31. The computer software product of claim 28 wherein said data output arrangement is a data display panel in said computer display screen, said data display panel being configured to display at least one user-selectable candidate match from said set of candidate matches.

32. The computer software product of claim 28 further comprising logic for disabling a default auto-complete feature prior to presenting in said computer display screen said set of candidate choices.

33. The computer software product of claim 26 wherein said data input arrangement is a first data input field in said computer display screen.

34. The computer software product of claim 33 wherein an association between a second data input field in said computer display screen and one of said plurality of dictionaries varies responsive to which dictionary in said plurality of dictionaries is employed as said first dictionary.

35. A computer-implemented method for facilitating auto-completion of user data input in a web page for a user of the web page, comprising:
building a web page, the web page configured with a first data input field;
provisionally associating a plurality of dictionary objects with the first data input field, the plurality of dictionary objects selected based on at least one of type, format, and content of the first data input field, the plurality of dictionary objects representing a subset of pre-configured dictionary objects;
receiving a first user data input in the first data input field;
automatically analyzing the first user data input to determine a first selected dictionary object from the plurality of dictionary objects that contains a first list of candidate matches to the first user input; and
presenting the first list of candidate matches to the user such that the user may optionally select one of the first list of candidate matches for the first data input field.

36. The method of claim 35 further comprising:
if the user selects one of the first list of candidate matches, associating the dictionary object containing the one of the first list of candidate matches with the first data input field.

37. The method of claim 36 further comprising:
receiving a second user data input in the first data input field;
revising the first list of candidate matches based on the second user data input to obtain a second list of candidate matches, members of said second list of candidate matches being also members of the first selected dictionary object; and
presenting said second list of candidate matches to the user in lieu of said first list of candidate matches.

38. The method of claim 36 wherein at least a portion of said web page is implemented using at least one of the Hypertext Markup Language (HTML) and the Extensible Markup Language (XML).

39. The method of claim 38 wherein the first user data input is analyzed using a data analyzing technique that includes parsing the first user data input.

40. The method of claim 36 wherein an association between a second data input field in the web page and one of the plurality of dictionary objects varies responsive to which dictionary object in the plurality of dictionary objects is employed as the first selected dictionary object.

41. The method of claim 36 wherein a number of data input fields in the web page changes depending on which dictionary object in the plurality of dictionary objects is employed as the first selected dictionary object.

42. The method of claim 36 wherein information presented in the web page changes depending on which dictionary object in the plurality of dictionary objects is employed as the first selected dictionary object.

43. The method of claim 36 wherein information presented in a subsequent web page that is presented later in time relative to web page changes depending on which dictionary object in the plurality of dictionary objects is employed as the first selected dictionary object.

44. The method of claim 36 wherein at least one of the plurality of dictionary objects is a file containing historical data entries by the user of the web page.

* * * * *